US008995964B2

(12) United States Patent
Kim

(10) Patent No.: US 8,995,964 B2
(45) Date of Patent: Mar. 31, 2015

(54) SCHEDULE MANAGING APPARATUS AND METHOD IN MOBILE TERMINAL

(75) Inventor: Seong-Nam Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 756 days.

(21) Appl. No.: 12/265,642

(22) Filed: Nov. 5, 2008

(65) Prior Publication Data

US 2009/0131030 A1    May 21, 2009

(30) Foreign Application Priority Data

Nov. 16, 2007 (KR) .................. 10-2007-0117527

(51) Int. Cl.
| | |
|---|---|
| H04M 1/00 | (2006.01) |
| H04N 5/445 | (2011.01) |
| H04N 21/414 | (2011.01) |
| H04N 21/472 | (2011.01) |
| H04H 60/25 | (2008.01) |
| H04H 60/72 | (2008.01) |

(52) U.S. Cl.
CPC .......... H04N 5/44543 (2013.01); *H04H 60/25* (2013.01); *H04H 60/72* (2013.01); *H04H 2201/11* (2013.01); H04N 21/41407 (2013.01); *H04N 21/47214* (2013.01)
USPC ............. 455/414.1; 455/418; 455/550.1; 455/566; 455/425; 455/560

(58) Field of Classification Search
CPC ........................................................ H04M 1/00
USPC ............... 455/414.1, 556.2, 560, 412.1, 466
See application file for complete search history.

(56) References Cited

U.S. PATENT DOCUMENTS

| | | | | |
|---|---|---|---|---|
| 7,836,039 | B2* | 11/2010 | Clark et al. .................... | 707/706 |
| 2003/0027520 | A1* | 2/2003 | Yamashita .................... | 455/3.04 |
| 2003/0078000 | A1 | 4/2003 | Tatsumi et al. | |
| 2003/0086694 | A1 | 5/2003 | Davidsson | |
| 2003/0121045 | A1 | 6/2003 | Cho | |
| 2005/0240968 | A1 | 10/2005 | Knudson et al. | |
| 2006/0059521 | A1* | 3/2006 | Lee et al. ........................ | 725/58 |
| 2006/0073816 | A1* | 4/2006 | Kim et al. .................... | 455/414.1 |
| 2006/0095936 | A1 | 5/2006 | Kim | |
| 2006/0143651 | A1* | 6/2006 | Kim ................................ | 725/39 |
| 2006/0253874 | A1 | 11/2006 | Stark et al. | |
| 2007/0054695 | A1* | 3/2007 | Huske et al. ................ | 455/556.2 |
| 2007/0067801 | A1* | 3/2007 | Monta et al. .................... | 725/44 |

FOREIGN PATENT DOCUMENTS

| | | |
|---|---|---|
| CN | 1493154 A | 4/2004 |
| CN | 1600021 A | 3/2005 |
| CN | 1770844 A | 5/2006 |
| CN | 1960398 A | 5/2007 |
| KR | 2003-0042617 A | 6/2003 |
| KR | 10-2003-0067990 A | 8/2003 |
| KR | 10-2007-0034369 A | 3/2007 |
| KR | 10-2007-0047601 A | 5/2007 |

* cited by examiner

*Primary Examiner* — Michael T Vu
(74) *Attorney, Agent, or Firm* — Birch, Stewart, Kolasch & Birch, LLP

(57) ABSTRACT

A mobile terminal including a broadcast receiver configured to receive broadcast program information related to available broadcast programs, a memory configured to store user-schedule information and the received broadcast program information, and a controller configured to update the stored user-schedule information to include a broadcast schedule corresponding to a broadcast program selected from the available broadcast programs included in the broadcast program information.

16 Claims, 15 Drawing Sheets

SCHEDULE MANAGING APPARATUS AND METHOD IN MOBILE TERMINAL

RELATED APPLICATION

The present invention claims priority to Korean Patent Application No. 10-2007-0117527, filed on Nov. 16, 2007, the contents of which is hereby incorporated by reference in its entirety.

BACKGROUND OF THE INVENTION

1. Field of the Invention

The present invention relates to a mobile terminal and corresponding method for scheduling and viewing broadcast programs on the mobile terminal.

2. Discussion of the Background

Mobile terminals now provide many additional services beside the basic call service. For example, user's can now access the Internet, play games, watch videos, listen to music, capture images and videos, record audio files, etc. Mobile terminals also now provide broadcasting programs such that user can watch television shows, sporting programs, videos, etc.

For example, many mobile terminals now comply with digital broadcasting technologies such as the Digital Audio Broadcasting (DAB) system in Europe (where the Eureka-147 standard has been adopted as the DAB standard), the Digital Audio Radio (DAR) system in the United States, the Digital Radio Broadcasting (DRB) system in Canada, the Digital Sound Broadcasting (DSB) system in the International Telecommunication Union (ITU-R), and the Digital Multimedia Broadcasting (DMB) in Korea.

The digital broadcasts can be received and viewed on the mobile terminals and include a variety of multimedia data such as news reports, weather and traffic information, geographic and location information, video information, and the like. Further, the digital broadcasts also include high quality CD level sound, which surpasses the sound quality of existing AM and FM radio broadcasts. Some digital broadcasting system also support bi-directional services that allow user interactions.

However, in the related art, a mobile terminal receiving a digital multimedia broadcast must first switch into a broadcasting mode to allow the user to select and view a broadcast program including a list of available broadcast programs. That is, the terminal first enters the broadcast mode, and then displays a broadcast program guide including a plurality of broadcast programs or channels that the user can select. This limited interaction causes the user inconvenience and does not sufficiently integrate other features provided by the mobile terminal. That is, the broadcast feature of the mobile terminal is activated independently of other functions on the terminal, which causes inconvenience to the user.

SUMMARY OF THE INVENTION

Accordingly, one object of the present invention is to address the above-noted and other drawbacks.

Another object of the present invention is to provide a mobile terminal and corresponding method that allows a user to conveniently schedule and manage broadcast programs.

To achieve these and other advantages and in accordance with the purpose of the present invention, as embodied and broadly described herein, the present invention provides in one aspect a mobile terminal including a broadcast receiver configured to receive broadcast program information related to available broadcast programs, a memory configured to store user-schedule information and the received broadcast program information, and a controller configured to update the stored user-schedule information to include a broadcast schedule corresponding to a broadcast program selected from the available broadcast programs included in the broadcast program information.

In another aspect, the present invention provides a method of controlling a mobile terminal, and which includes receiving broadcast program information related to available broadcast programs, storing user-schedule information and the received broadcast program information, and updating the stored user-schedule information to include a broadcast schedule corresponding to a broadcast program selected from the available broadcast programs included in the broadcast program information.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein.

DETAILED DESCRIPTION OF THE INVENTION

Reference will now be made in detail to the preferred embodiments of the present invention, examples of which are illustrated in the accompanying drawings.

Figure 1:
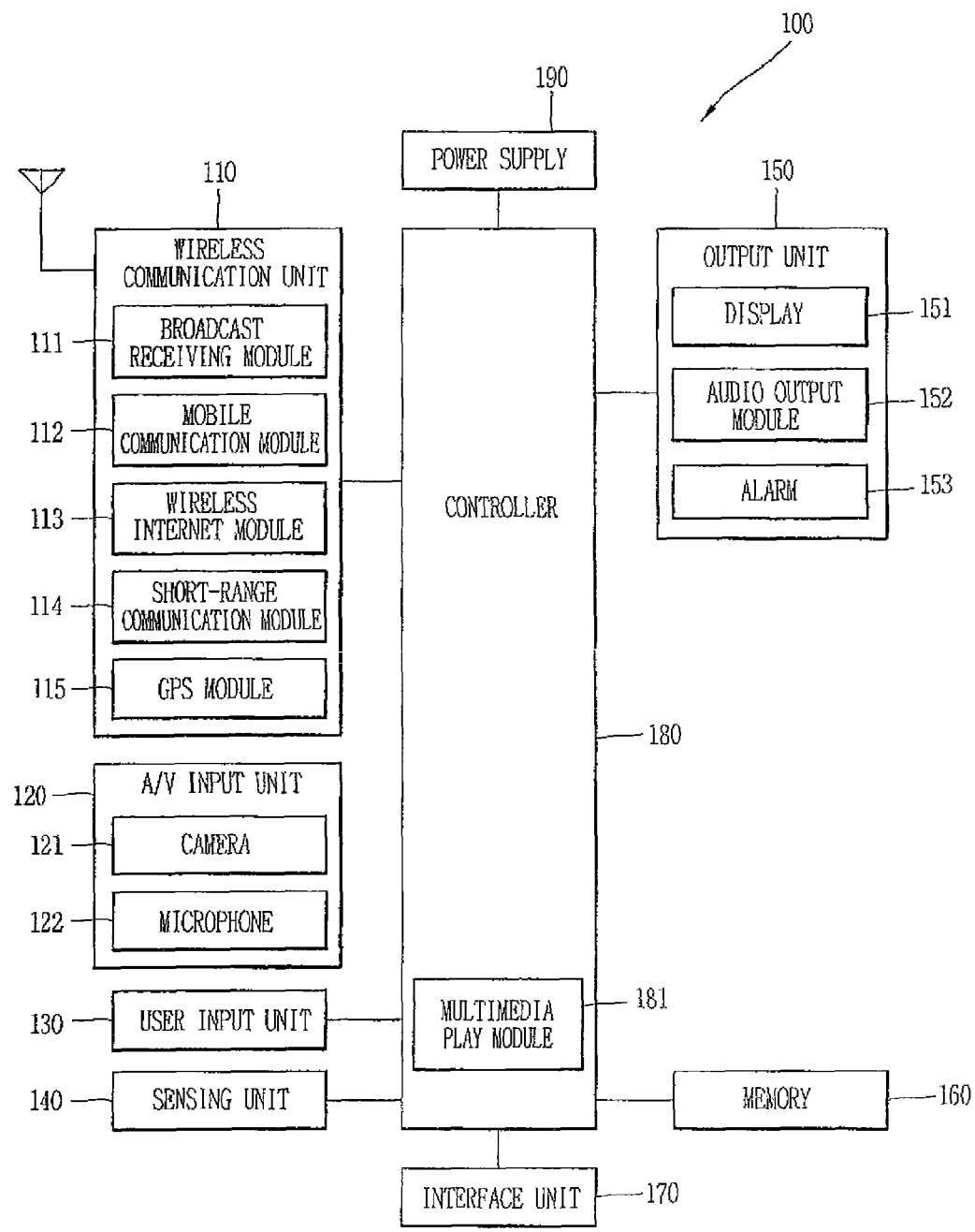
FIG. 1 is a block diagram illustrating a mobile terminal according to one embodiment of the present invention.

FIG. 1 is a block diagram of a mobile terminal 100 according to an embodiment of the present invention. As shown, the mobile terminal 100 includes a wireless communication unit 110 having one or more components which permits wireless communication between the mobile terminal 100 and a wireless communication system or network within which the mobile terminal is located.

For example, the wireless communication unit 110 includes a broadcast receiving module 111 that receives a broadcast signal and/or broadcast associated information from an external broadcast managing entity via a broadcast channel. The broadcast channel may include a satellite channel and a terrestrial channel.

In addition, the broadcast managing entity generally refers to a system which transmits a broadcast signal and/or broadcast associated information. Examples of broadcast associated information include information associated with a broadcast channel, a broadcast program, a broadcast service provider, etc. For instance, broadcast associated information may include an electronic program guide (EPG) of digital multimedia broadcasting (DMB) and electronic service guide (ESG) of digital video broadcast-handheld (DVB-H).

In addition, the broadcast signal may be implemented as a TV broadcast signal, a radio broadcast signal, and a data broadcast signal, among others. The broadcast signal may further include a broadcast signal combined with a TV or radio broadcast signal.

The broadcast receiving module 111 is also configured to receive broadcast signals transmitted from various types of broadcast systems. For example, such broadcasting systems include the digital multimedia broadcasting-terrestrial (DMB-T) system, the digital multimedia broadcasting-satellite (DMB-S) system, the digital video broadcast-handheld (DVB-H) system, the data broadcasting system known as media forward link only (MediaFLO®) and the integrated services digital broadcast-terrestrial (ISDB-T) system among others. Receiving multicast signals is also possible. Further, data received by the broadcast receiving module 111 may be stored in a suitable device, such as a memory 160.

The wireless communication unit 110 also includes a mobile communication module 112 that transmits/receives wireless signals to/from one or more network entities (e.g., base station, Node-B). Such signals may represent audio, video, multimedia, control signaling, and data, among others.

Also included is a wireless Internet module 113 that supports Internet access for the mobile terminal. The module 113 may be internally or externally coupled to the terminal. The wireless communication unit 110 also includes a short-range communication module 114 that facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

A position-location module 115 is also included in the wireless communication unit 110 and identifies or otherwise obtains the location of the mobile terminal 100. The position-location module 115 may be implemented using global positioning system (GPS) components which cooperate with associated satellites, network components, and combinations thereof. Here, the position information may include coordinate information represented by latitude and longitude values. For example, the GPS module can measure an accurate time and distance respectively using three or more satellites so as to accurately calculate a current position of the mobile terminal based on such three different distances according to a triangulation procedure. A scheme may also be used to obtain time information and distance information from three satellites and perform error correction using one satellite. Specifically, the GPS module can obtain three-dimensional speed information, accurate time information, as well as latitude, longitude and altitude values using the position information received from the satellites.

In addition, as shown in FIG. 1, the mobile terminal 100 also includes an Audio/video (A/V) input unit 120 that provides audio or video signals to the mobile terminal 100. As shown, the A/V input unit 120 includes a camera 121 and a microphone 122. The camera 121 receives and processes image frames of still pictures or video.

Further, the microphone 122 receives an external audio signal while the portable device is in a particular mode, such as a phone call mode, recording mode and voice recognition mode. The received audio signal is then processed and converted into digital data. Also, the portable device, and in particular, the A/V input unit 120, typically includes assorted noise removing algorithms to remove noise generated in the course of receiving the external audio signal. In addition, data generated by the A/V input unit 120 may be stored in the memory 160, utilized by an output unit 150, or transmitted via one or more modules of the communication unit 110. If desired, two or more microphones and/or cameras may be used.

Various types of touch sensitive technologies may also be supported. Detection of the user's finger(s), a stylus, or other object(s) placed in direct contact with the screen can be performed. Also, a proximity detection method may be employed, whereby the user's finger(s) or object is detected when placed near the screen without having to contact with the screen itself. Also, the touch pad (or other touch sensitive membrane) may be combined onto the display 151 to thus form a touch screen, which allows for both user inputs via touching and provides visual outputs.

The mobile terminal 100 also includes a user input unit 130 that generates input data responsive to user manipulation of an associated input device or devices. Examples of such devices include a keypad, a dome switch, a touchpad (e.g., static pressure/capacitance), a jog wheel and a jog switch. A specific example is one in which the user input unit 130 is configured as a touchpad in cooperation with a touch screen display, which will be described in more detail below.

A sensing unit 140 is also included in the mobile terminal 100 and provides status measurements of various aspects of the mobile terminal 100. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100, etc.

As an example, when the mobile terminal 100 is a slide-type mobile terminal, the sensing unit 140 may sense whether a sliding portion of the mobile terminal 100 is open or closed. Other examples include the sensing unit 140 sensing the presence or absence of power provided by a power supply 190, the presence or absence of a coupling or other connection between an interface unit 170 and an external device, etc.

Further, the interface unit 170 is often implemented to couple the mobile terminal 100 with external devices. Typical external devices include wired/wireless headphones, external chargers, power supplies, storage devices configured to store data (e.g., audio, video, pictures, etc.), earphones, and microphones, among others. In addition, the interface unit 170 may be configured using a wired/wireless data port, a card socket (e.g., for coupling to a memory card, a subscriber identity module (SIM) card, a user identity module (UIM) card, a removable user identity module (RUIM) card, etc.), audio input/output ports and video input/output ports.

The identification module may be configured as a chip for storing various information required to authenticate the proper use of the mobile terminal 100, which may include the UIM, SIM, USIM, etc. Also, a device that includes the identification module may be implemented in the form of a so-called smart card or other card-like element. Hence, the identification device can be coupled to the mobile terminal 100 via a port or other connector. Further, the interface unit 170 may be used to receive data from an external device, to transfer data or power to components within the mobile terminal 100, or to transfer data from the mobile terminal 100 to an external device.

The output unit 150 generally includes various components which support the output requirements of the mobile terminal 100. The mobile terminal 100 also includes a display 151 that visually displays information associated with the mobile terminal 100. For instance, if the mobile terminal 100 is operating in a phone call mode, the display 151 will generally provide a user interface or graphical user interface which includes information associated with placing, conducting, and terminating a phone call. As another example, if the mobile terminal 100 is in a video call mode or a photographing mode, the display 151 may additionally or alternatively display images which are associated with these modes.

Further, the display 151 also preferably includes a touch screen working in cooperation with an input device, such as a touchpad. This configuration permits the display 151 to function both as an output device and an input device. In addition, the display 151 may be implemented using display technologies including, for example, a liquid crystal display (LCD), a thin film transistor-liquid crystal display (TFT-LCD), an organic light-emitting diode display (OLED), a flexible display and a three-dimensional display.

The mobile terminal 100 may also include one or more of such displays. An example of a two-display embodiment is one in which one display is configured as an internal display (viewable when the terminal is in an opened position) and a second display configured as an external display (viewable in both the open and closed positions).

FIG. 1 further shows the output unit 150 having an audio output module 152 which supports the audio output requirements of the mobile terminal 100. The audio output module 152 is often implemented using one or more speakers, buzzers, other audio producing devices, and combinations thereof.

Further, the audio output module 152 functions in various modes including a call-receiving mode, a call-placing mode, a recording mode, a voice recognition mode and a broadcast reception mode. During operation, the audio output module 152 outputs audio relating to a particular function (e.g., call received, message received, and errors).

In addition, the output unit 150 is further shown having an alarm 153, which is used to signal or otherwise identify the occurrence of a particular event associated with the mobile terminal 100. Typical events include a call received, a message received and user input received. An example of such output includes the providing of tactile sensations (e.g., vibration) to a user. For instance, the alarm 153 may be configured to vibrate responsive to the mobile terminal 100 receiving a call or message.

As another example, a vibration is provided by the alarm 153 responsive to receiving user input at the mobile terminal 100, thus providing a tactile feedback mechanism. Further, the various outputs provided by the components of the output unit 150 may be separately performed, or such output may be performed using any combination of such components.

In addition, the memory 160 is generally used to store various types of data to support the processing, control, and storage requirements of the mobile terminal 100. Examples of such data include program instructions for applications operating on the mobile terminal 100, call history, contact data, phonebook data, messages, pictures, video, etc.

Further, the memory 160 shown in FIG. 1 may be implemented using any type or combination of suitable volatile and non-volatile memory or storage devices including random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, card-type memory, or other similar memory or data storage device.

The terminal 100 also includes a controller 180 that typically controls the overall operations of the mobile terminal 100. For instance, the controller 180 performs the control and processing associated with voice calls, data communications, instant message communications, video calls, camera operations and recording operations. As shown in FIG. 1, the controller 180 may also include a multimedia module 181 for providing multimedia playback functions. The multimedia module 181 may be configured as part of the controller 180, or may be implemented as a separate component.

In addition, a power supply 190 provides power used by the various components for the portable device. The provided power may be internal power, external power, or combinations thereof.

Figure 2:
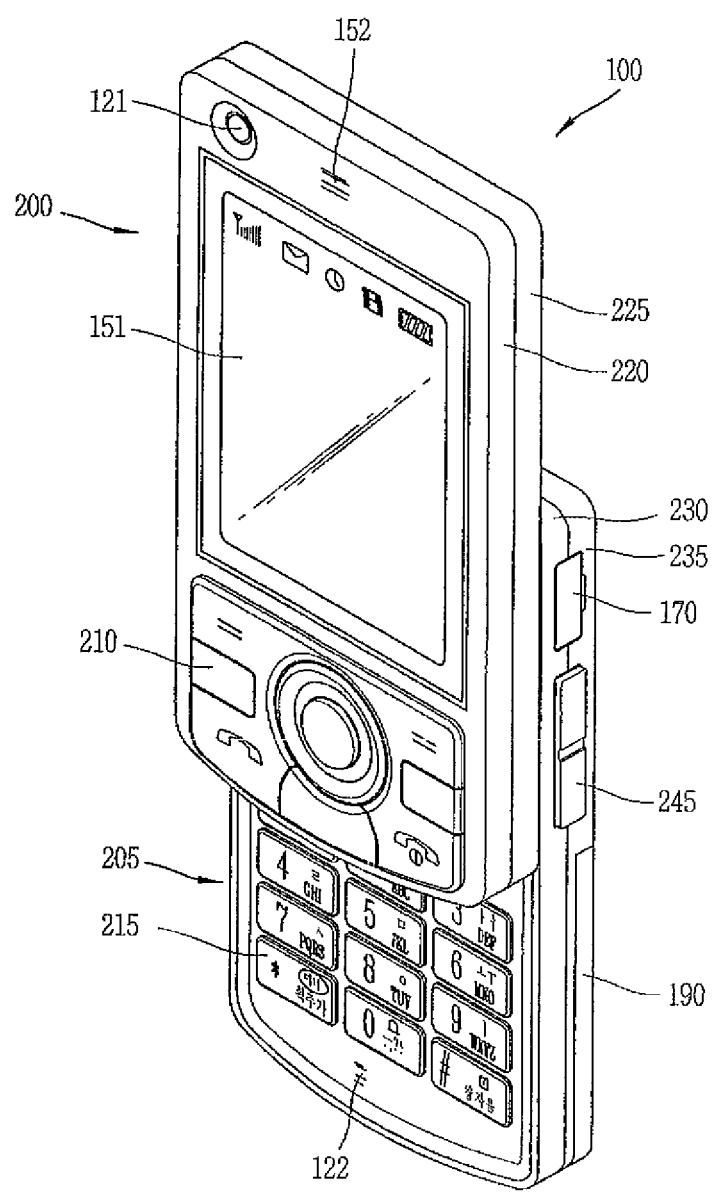
FIG. 2 is a front perspective view illustrating a mobile terminal according to an embodiment of the present invention.

Next, FIG. 2 is a front side view of the mobile terminal 100 according to an embodiment of the present invention. As shown in FIG. 2, the mobile terminal 100 includes a first body 200 configured to slideably cooperate with a second body 205. The user input unit 130 described in FIG. 1 may include a first input unit such as function keys 210, a second input unit such as a keypad 215, and a third input unit such as side keys 245.

The function keys 210 are associated with the first body 200, and the keypad 215 is associated with the second body 205. The keypad 215 includes various keys (e.g., numbers, characters, and symbols) to enable a user to place a call, prepare a text or multimedia message, and otherwise operate the mobile terminal 100.

In addition, the first body 200 slides relative to the second body 205 between open and closed positions. In a closed position, the first body 200 is positioned over the second body 205 in such a manner that the keypad 215 is substantially or completely obscured by the first body 200. In the open position, user access to the keypad 215, as well as the display 151 and function keys 210, is possible. The function keys 210 are convenient to a user for entering commands such as start, stop and scroll commands.

Further, the mobile terminal 100 is operable in either a standby mode (e.g., able to receive a call or message, receive and respond to network control signaling), or an active call mode. Typically, the mobile terminal 100 functions in a standby mode when in the closed position, and an active mode when in the open position. However, the mode configuration may be changed as required or desired.

In addition, the first body 200 is formed from a first case 220 and a second case 225, and the second body 205 is formed from a first case 230 and a second case 235. The first and second cases are preferably formed from a suitably ridge material such as injection molded plastic, or formed using metallic material such as stainless steel (STS) and titanium (Ti).

If desired, one or more intermediate cases may be provided between the first and second cases of one or both of the first and second bodies 200 and 205. In addition, the first and second bodies 200 and 205 are typically sized to receive electronic components used to support the operation of the mobile terminal 100.

Also, the first body 200 includes the camera 121 and the audio output unit 152, which is configured as a speaker, positioned relative to the display 151. The camera 121 may also be constructed in such a manner that it can be selectively positioned (e.g., rotated, swiveled, etc.) relative to the first body 200.

Further, the function keys 210 are positioned adjacent to a lower side of the display 151. As discussed above, the display 151 can be implemented as an LCD or OLED. The display 151 may also be configured as a touch screen having an underlying touchpad which generates signals responsive to user contact (e.g., finger, stylus, etc.) with the touch screen.

Also, the second body 205 includes the microphone 122 positioned adjacent to the keypad 215, and side keys 245, which are one type of a user input unit, positioned along the side of the second body 205. Preferably, the side keys 245 are configured as hot keys, such that the side keys 245 are associated with a particular function of the mobile terminal 100. As shown, the interface unit 170 is positioned adjacent to the side keys 245, and the power supply 190 in a form of a battery is located on a lower portion of the second body 205.

Figure 3:
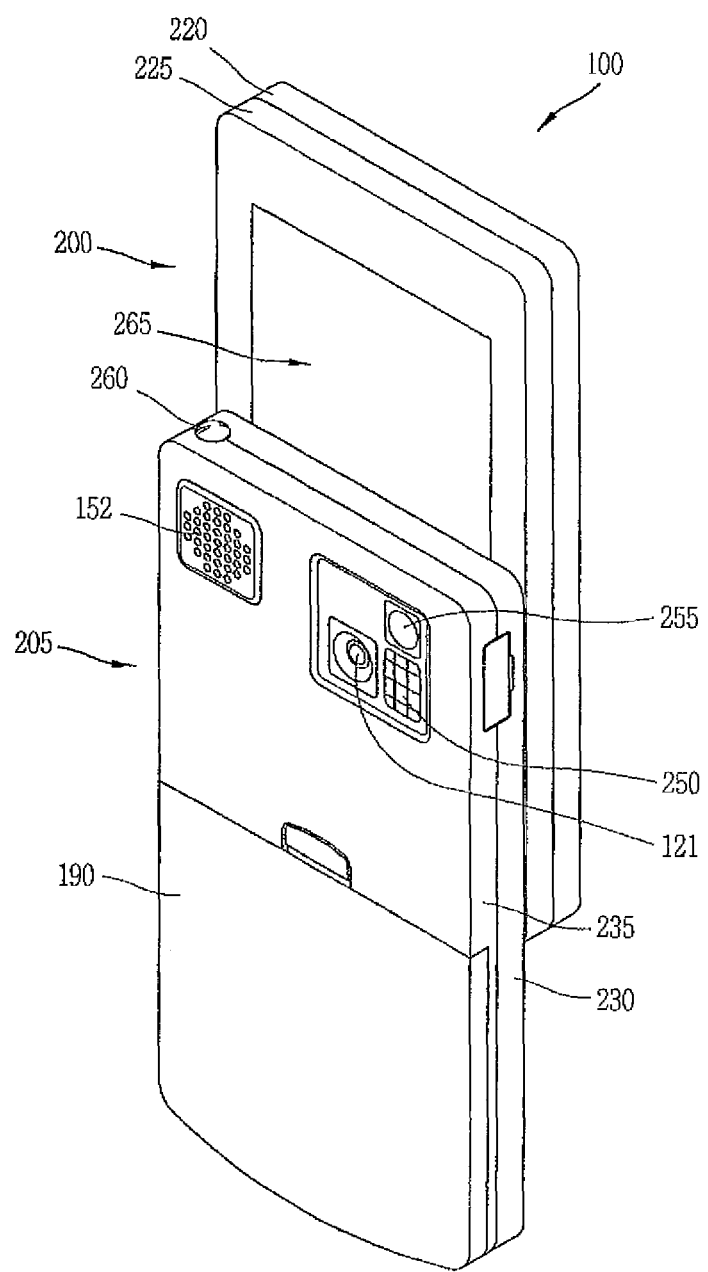
FIG. 3 is a rear perspective view illustrating the mobile terminal in FIG. 2

FIG. 3 is a rear side view of the mobile terminal 100 shown in FIG. 2. As shown in FIG. 3, the second body 205 includes the camera 121, and an associated flash 250 and mirror 255. The flash 250 operates in conjunction with the camera 121 of the second body 205, and the mirror 255 is useful for assisting a user to position the camera 121 in a self-portrait mode. In addition, the camera 121 of the second body 205 faces a direction which is opposite to a direction faced by the camera 121 of the first body 200 shown in FIG. 2.

In addition, each of the cameras 121 of the first and second bodies 200 and 205 may have the same or different capabilities. For example, in one embodiment, the camera 121 of the first body 200 operates with a relatively lower resolution than the camera 121 of the second body 205. Such an arrangement works well during a video conference call, for example, in which reverse link bandwidth capabilities may be limited. Further, the relatively higher resolution of the camera 121 of the second body 205 (FIG. 3) is useful for obtaining higher quality pictures for later use.

The second body 205 also includes the audio output module 152 configured as a speaker, and which is located on an upper side of the second body 205. The audio output modules of the first and second bodies 200 and 205 may also cooperate together to provide stereo output. Moreover, either or both of these audio output modules may be configured to operate as a speakerphone.

The terminal 100 also includes a broadcast signal receiving antenna 260 located at an upper end of the second body 205. The antenna 260 functions in cooperation with the broadcast receiving module 111 (FIG. 1). If desired, the antenna 260 may be fixed or configured to retract into the second body 205. Further, the rear side of the first body 200 includes a slide module 265, which slideably couples with a corresponding slide module located on the front side of the second body 205.

In addition, the illustrated arrangement of the various components of the first and second bodies 200 and 205 may be modified as required or desired. In general, some or all of the components of one body may alternatively be implemented on the other body. Further, the location and relative positioning of such components may be positioned at locations which differ from those shown by the representative figures.

In addition, the mobile terminal 100 of FIGS. 1-3 may be configured to operate within a communication system which transmits data via frames or packets, including both wireless and wireline communication systems, and satellite-based communication systems. Such communication systems utilize different air interfaces and/or physical layers.

Examples of such air interfaces utilized by the communication systems include, for example, frequency division multiple access (FDMA), time division multiple access (TDMA), code division multiple access (CDMA), and universal mobile telecommunications system (UMTS), the long term evolution (LTE) of the UMTS, and the global system for mobile communications (GSM). By way of a non-limiting example only, further description will relate to a CDMA communication system, but such teachings apply equally to other system types.

Figure 4:
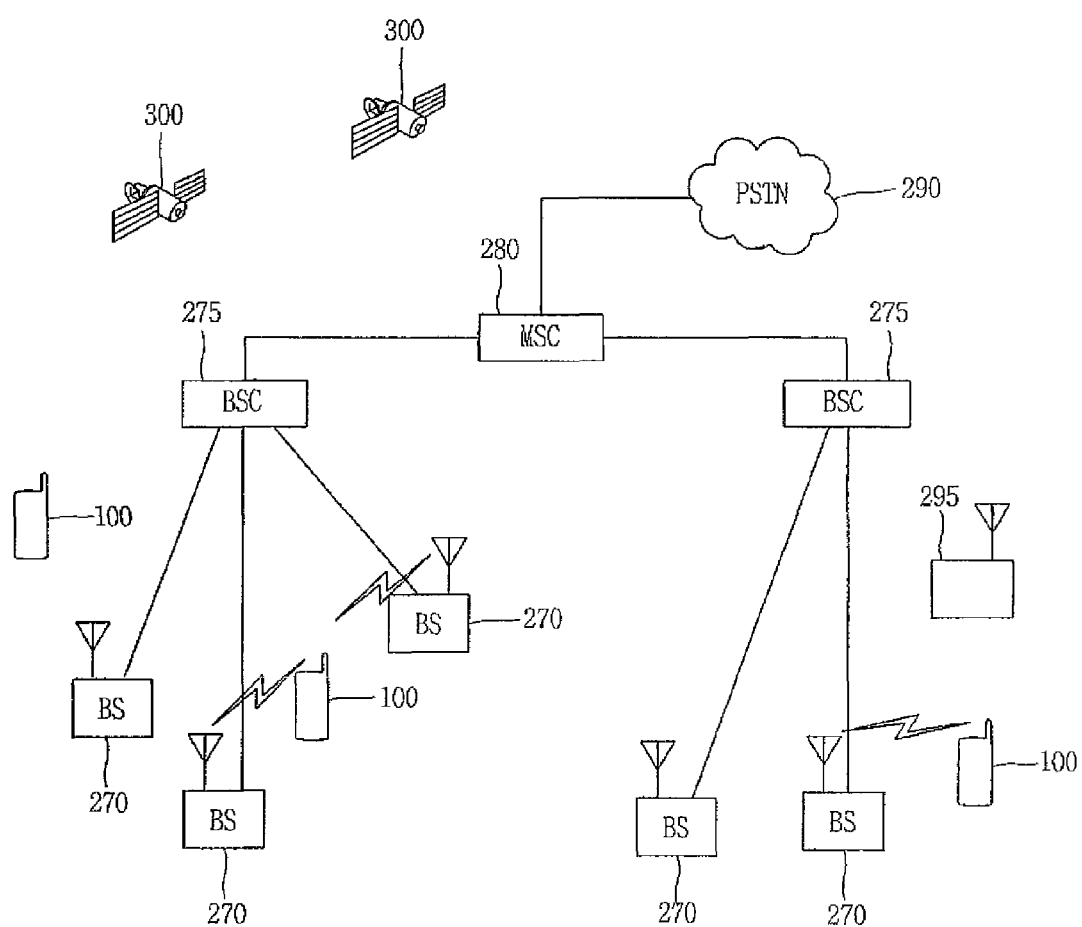
FIG. 4 is a block diagram illustrating a wireless communication system operable with the mobile terminal in FIGS. 1-3 according to an embodiment of the present invention.

Next, FIG. 4 illustrates a CDMA wireless communication system having a plurality of mobile terminals 100, a plurality of base stations 270, a plurality of base station controllers (BSCs) 275, and a mobile switching center (MSC) 280.

The MSC 280 is configured to interface with a public switch telephone network (PSTN) 290, and the MSC 280 is also configured to interface with the BSCs 275. Further, the BSCs 275 are coupled to the base stations 270 via backhaul lines. In addition, the backhaul lines may be configured in accordance with any of several interfaces including, for example, E1/T1, ATM, IP, PPP, Frame Relay, HDSL, ADSL, or xDSL. Further, the system may include more than two BSCs 275.

Also, each base station 270 may include one or more sectors, each sector having an omnidirectional antenna or an antenna pointed in a particular direction radially away from the base station 270. Alternatively, each sector may include two antennas for diversity reception. In addition, each base station 270 may be configured to support a plurality of frequency assignments, with each frequency assignment having a particular spectrum (e.g., 1.25 MHz, 5 MHz).

The intersection of a sector and frequency assignment may be referred to as a CDMA channel. The base stations 270 may also be referred to as base station transceiver subsystems (BTSs). In some instances, the term "base station" may be used to refer collectively to a BSC 275, and one or more base stations 270.

The base stations 270 may also be denoted as "cell sites." Alternatively, individual sectors of a given base station 270 may be referred to as cell sites. Further, a terrestrial digital multimedia broadcasting (DMB) transmitter 295 is shown broadcasting to mobile terminals 100 operating within the system.

In addition, the broadcast receiving module 111 (FIG. 1) of the mobile terminal 100 is typically configured to receive broadcast signals transmitted by the DMB transmitter 295. Similar arrangements may be implemented for other types of broadcast and multicast signaling as discussed above.

FIG. 4 further illustrates several global positioning system (GPS) satellites 300. Such satellites facilitate locating the position of some or all of the mobile terminals 100. In FIG. 4, two satellites are shown, but positioning information may be obtained with greater or fewer satellites.

In addition, the position-location module 115 (FIG. 1) of the mobile terminal 100 is typically configured to cooperate with the satellites 300 to obtain desired position information. However, other types of position detection technology, such as location technology that may be used in addition to or instead of GPS location technology, may alternatively be implemented. Some or all of the GPS satellites 300 may alternatively or additionally be configured to provide satellite DMB transmissions.

Further, during typical operation of the wireless communication system, the base stations 270 receive sets of reverse-link signals from various mobile terminals 100. The mobile terminals 100 engage in calls, messaging, and other communications.

In addition, each reverse-link signal received by a given base station 270 is processed within that base station 270, and the resulting data is forwarded to an associated BSC 275. The BSC 275 provides call resource allocation and mobility management functionality including soft handoffs between the base stations 270.

Further, the BSCs 275 also route the received data to the MSC 280, which provides additional routing services for interfacing with the PSTN 290. Similarly, the PSTN interfaces with the MSC 280, and the MSC 280 interfaces with the BSCs 275. The BSCs 275 also control the base stations 270 to transmit sets of forward-link signals to the mobile terminals 100.

In the following description, a control method applicable to the above-configured mobile terminal 100 is explained with respect to various embodiments. However, the following embodiments can be implemented independently or through combinations thereof. In addition, in the following description, it is assumed that the display 151 includes a touch screen.

Further, the mobile terminal according to embodiments of the present invention includes schedule management features. In more detail, schedule management refers to scheduling events such as birthdays, meeting, etc. and also scheduling broadcast programs. In addition, many different conditions are considered to manage a broadcast schedule or reserved viewing of broadcast programs.

For example, broadcast program schedule setting methods include setting schedules using a scheduler, setting schedules using a program guide and a setting schedules while viewing a broadcast program. These different types of broadcast program schedule setting methods will now be explained in more detail with reference to FIGS. 5-15.

Setup at Scheduler

Figure 5:
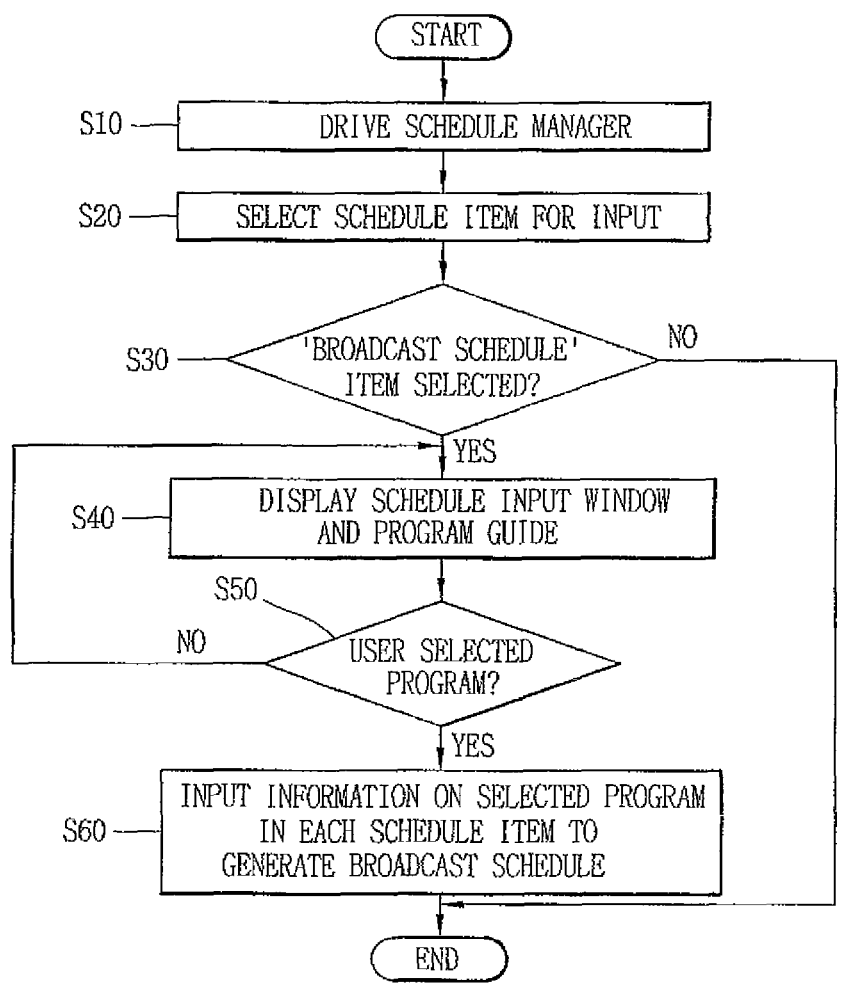
FIG. 5 is a flowchart illustrating an method of inputting a broadcast schedule according to an embodiment of the present invention.
Figure 6:
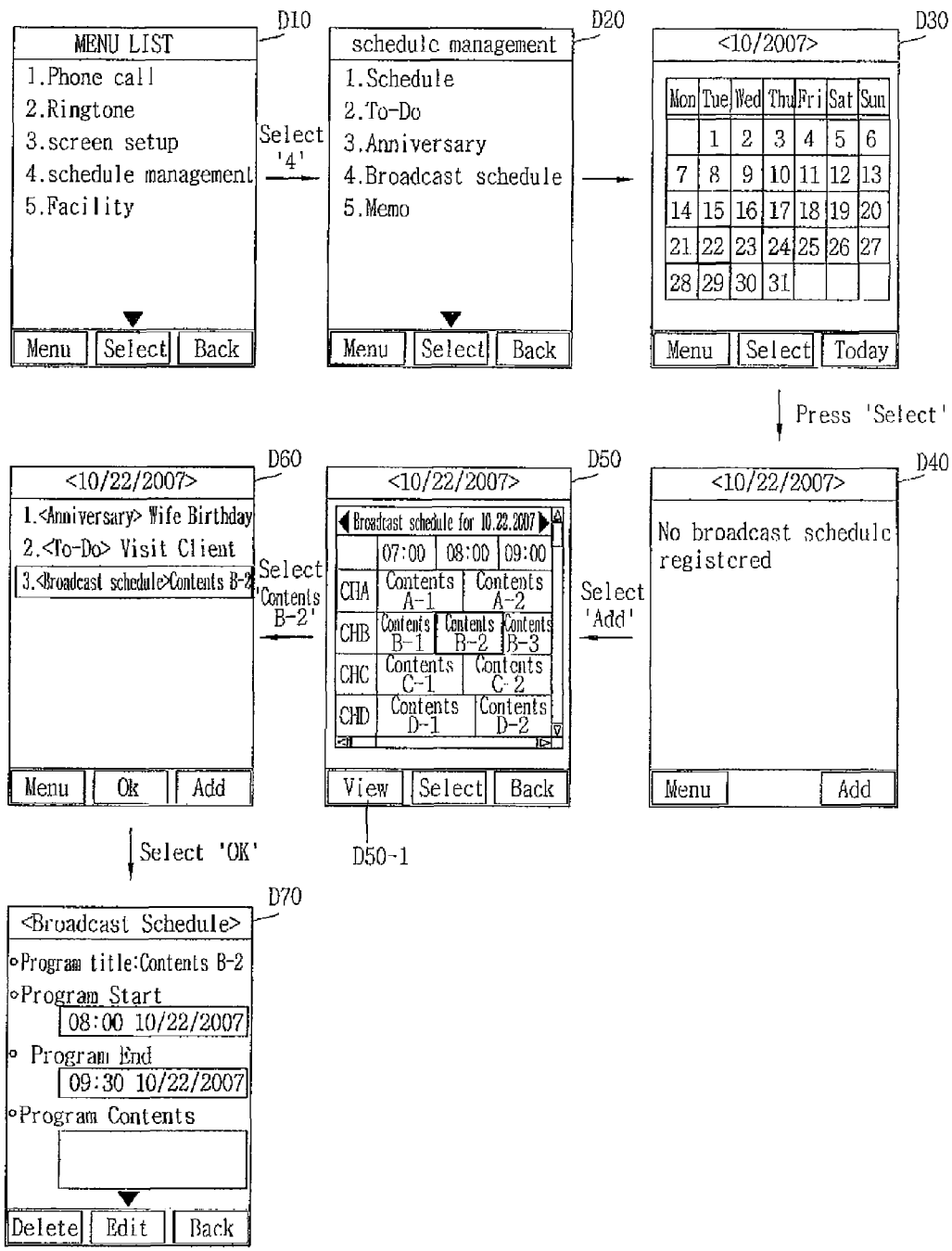
FIG. 6 is an overview of display screens illustrating a method of generating a broadcast schedule in the embodiment of FIG. 5.

The method of setting schedules for broadcast programs using a scheduler (hereinafter, referred to as 'scheduler manager') is illustrated in FIGS. 5 and 6. That, FIG. 5 is a flowchart illustrating an method of inputting a broadcast schedule, and FIG. 6 is an overview of display screens illustrating a method of generating a broadcast schedule in the embodiment of FIG. 5. FIG. 1 will also be referred to throughout the description of the invention.

As shown in FIG. 5, when the user enters a command to execute a schedule manager on the terminal, the controller 180 drives or executes the schedule manager (S10). For example, and as shown in FIG. 6, the user can request the schedule manager be executed by selecting a schedule management option 4 provided in a displayed menu list D10. When the user selects the option 4, the controller 180 executes the scheduler manager and displays a schedule management window D20 including a plurality of scheduling options that the user can select.

Then, if the user selects 'broadcast schedule' or 'telecasting schedule' in the window D20 (S20 in FIG. 5), the controller 180 displays a schedule input window D30. In the example shown in FIG. 6, the schedule input window D30 corresponds to a calendar. However, other methods may be used such as allowing the user to directly input a date (Month/Day/Year) and time on a schedule edit screen.

As shown in FIG. 6, the user then selects the date (Oct. 22, 2007) from the displayed calendar, and the controller 180 displays a schedule edit window D40 In this example, no broadcast programs have been scheduled for this date. In addition, when the user selects the 'ADD' button to add a broadcast schedule (Yes in S30), the controller 180 displays a program guide or log in a window D50 (S40). FIG. 6 illustrates an example of the displayed program guide window D50.

In addition, the program guide information displayed in the window D50 includes information extracted from an ESG or EPG and includes a time table or program log for programs to be broadcast on the selected date (e.g., Oct. 22, 2007). Further, the program guide provided in a broadcast mode is preferably used for the information about broadcast programs.

The user can then select one of the broadcast programs in the program schedule displayed in the window D50 by manipulating navigation keys, touch screen inputs or proximity touch inputs, voice commands, and the like. When the user selects a specific program (e.g., the Contents B-2 in the window D50) from the program guide and the user selects the 'Select' option (Yes in S50), the controller 180 generates a new broadcast schedule as shown in the schedule edit window D60 in FIG. 6. The user can also select the 'View' option D50-1 to view the selected program instead of selecting the 'Select' option.

The user can also select the 'Ok' option from the window D60, and the controller 180 displays various information (e.g., the title, start and end times, program related contents and the like) related to the corresponding program based upon the broadcast additional information (e.g., ESG information) as shown in the window D70. That is, the controller 180 automatically generates the broadcast schedule information when the user selects the desired program without the user having to enter the start and end times, etc.

In addition, after the user selects a particular program from the display window D50, the controller can also prompt the user to save the selected program in their favorites or preferred program list.

Figure 7:
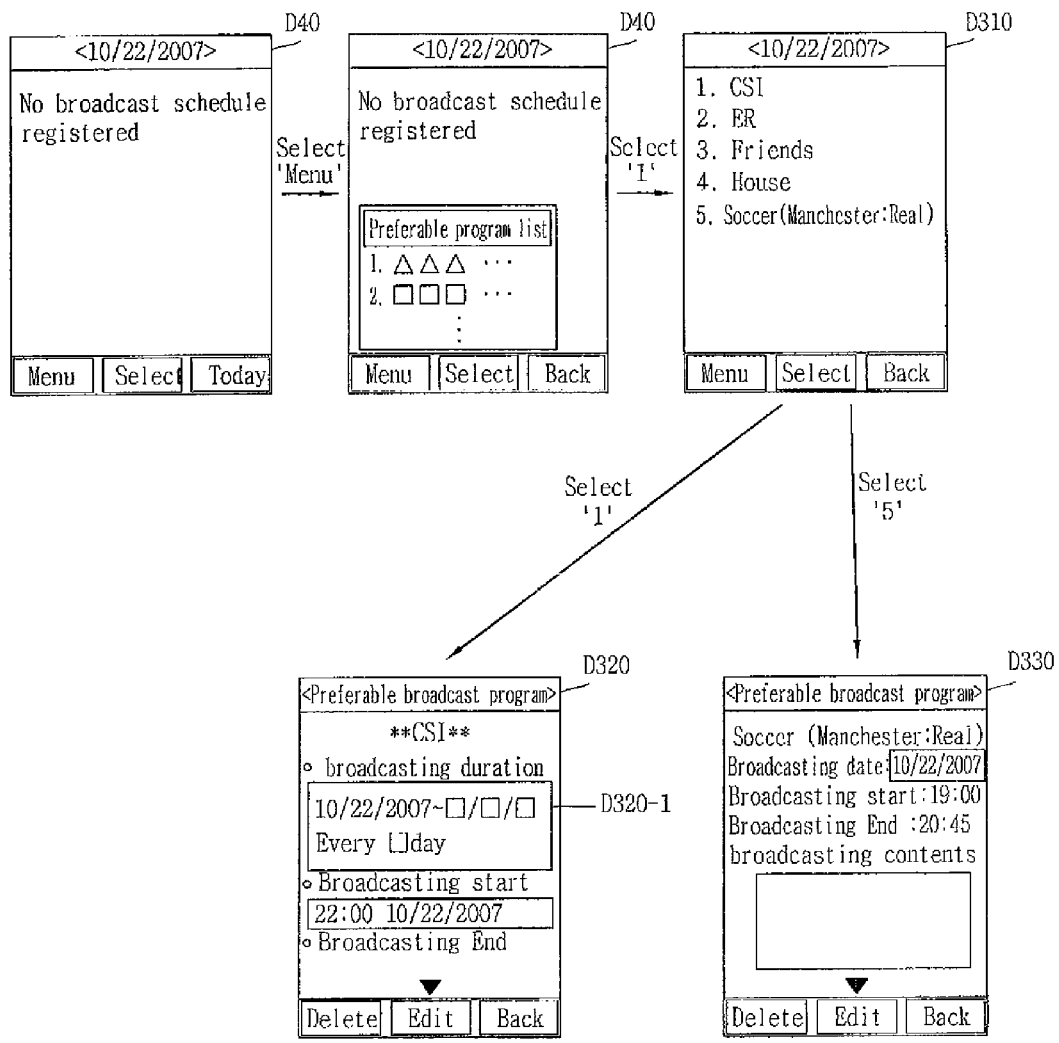
FIG. 7 is an overview of display screens illustrating preferable broadcast programs.

Further, FIG. 7 illustrates an alternative method in which the user can view broadcast programs in their preferred program list (also called a "favorites" list). As shown in FIG. 7, when the user selects a date from the calendar shown in the window D30 in FIG. 6, the controller 180 displays the schedule edit window D40. As shown in FIG. 7, no broadcast programs are scheduled for the selected day. Then, when the user selects the 'Menu' option, the controller 180 outputs a message asking the user if they want to view a list or preferred broadcast programs. The preferred broadcast programs can be a list of previously stored broadcast programs that the user generated, or may be a list of broadcast programs preferred by the overall broadcast community (e.g., the most viewed broadcast programs, etc.).

In the window D40 in FIG. 7, the preferable program list includes different options the user may select (e.g., options 1, 2 . . . ). The options may be categories such as preferred comedy broadcast programs, preferred sporting programs, preferred dramas, or a mixture of preferred programs. In FIG. 7, the user has selected the option '1' and the controller 180 displays the window D310 including a list of preferred broadcast programs.

The user can then select any one of the list of broadcast programs to determine if they are being broadcasted on the selected date. For example, illustrates the user select the option '1. CSI' in which the controller 180 displays the window D320 including relevant information about the broadcast program CSI. As shown in the example in FIG. 7, the controller 180 displays information D320-1 indicating the broadcast program CSI is broadcast everyday starting at 10:00 PM (22:00). A similar concept applies to the window D330 when the user selects the option "5.soccer".

Therefore, with reference to FIGS. 6 and 7, the user can select a broadcast program from a broadcast program guide in which the selected broadcast program is integrated with other user-schedule information (i.e., Anniversary, to-do list, etc.) as shown in the display window D60. The user can also add a selected broadcast program that is integrated into the user-schedule to a preferred list of broadcast programs. Alternatively, the user can view preferred broadcast programs that are scheduled to be broadcast on a particular date as shown in FIG. 7. The user can also view detailed information about a particular broadcast program in the preferred list by selecting, the broadcast program as shown in the windows D310, D320 and D330.

The controller 180 can also add a program selected from the list of preferred programs in the window D310 to be integrated with the user-schedule. For example, the controller 180 can automatically add a program selected in the window D310 to be integrated with the user schedule and display the information shown in windows D320 and D330. If the program selected by the user is a periodically broadcast program, for example, a weekly TV show (e.g., a program broadcast on every Monday) such as a drama or soap opera, a broadcast duration of the corresponding program is set. In addition, the controller 180 detects the information related to the duration, for which the corresponding program is broadcast, based upon the broadcast additional information (e.g., ESG information or the like), thereby setting the broadcast duration. If the broadcast additional information (e.g., ESG information or the like) does not include such broadcast duration of the corresponding program, the controller 180 sets a default value (e.g., one month) for the broadcast duration.

Further, the broadcast duration can optionally be edited (modified) by the user. During the broadcast duration, the controller 180 performs an alarm operation according to the alarm related setup information for the broadcast schedule (this feature is described in more detail later).

In addition, every time the broadcast additional information (e.g., ESG, etc.) of the mobile terminal is updated, the controller 180 compares the updated information with program related information registered in the list, and updates the contents. Thus, whenever the broadcast additional information is updated, the controller 180 automatically applies the updated information to the broadcast schedule such that the scheduler includes the most updated information. The controller 180 can in one example compare the stored additional information with newly received broadcast additional information to determine if the schedule data needs to be updated.

In addition, as discussed above, the user can also select the 'View' option D50-1 in FIG. 6 to view the selected program. In one embodiment, the option D50-1 is a "soft key" (i.e., a graphic icon displayed on the screen) that the user can touch to view the selected program in a schedule editing mode. Therefore, the soft key can be use to function as a "hot key" that enables activation of a certain function in a more convenient manner. Upon sensing an input of the soft key D50-1, the controller 180 converts the mobile terminal operation mode into a broadcast mode, and receives broadcast data of the corresponding program so as to output the broadcast data on a screen.

In addition, the user can also input various optional items when generating a schedule such as an alarm indicating a broadcast program is about to start or has started. The user can also set the type of alarm (e.g., vibration, lamp, bell sound, etc.), the number of repetitions of the alarm, the intervals between alarms, etc. These various optional items can also be set at default values that the user can then later change.

Figure 8:
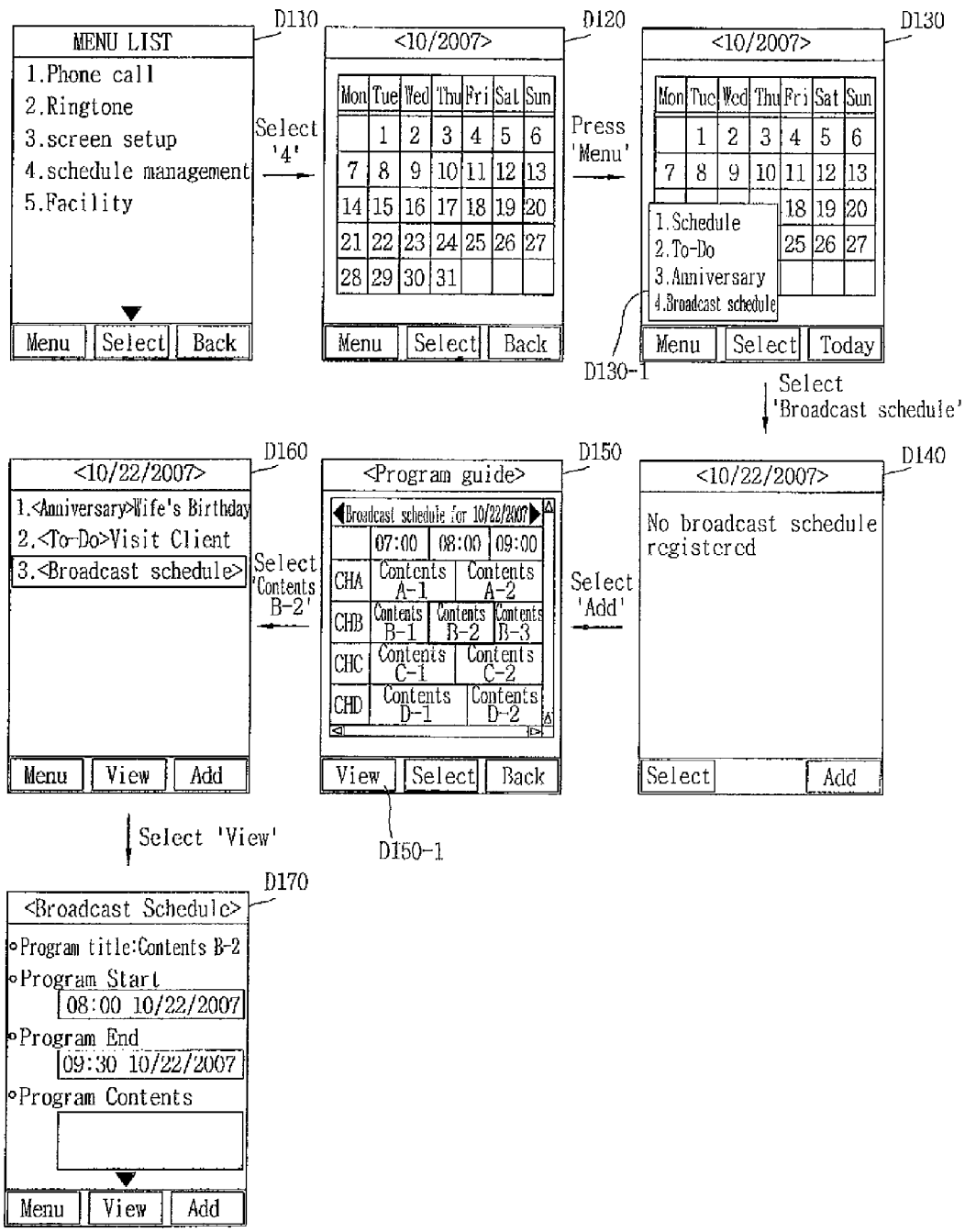
FIG. 8 is an overview of display screens illustrating a method of inputting a broadcast schedule according to another embodiment of the present invention.

Next, FIG. 8 is an overview if display screens illustrating a method of inputting a broadcast schedule according to another embodiment of the present invention. That is, FIG. 8 illustrates the controller 180 displaying the calendar in a window D120 without first displaying schedule items (i.e., the controller 180 does not display the window D20 in FIG. 6, but rather directly displays the window D120 when the user select item '4' from the menu list window D110.

Then, when the user selects the "Menu" option in the window P120, the controller 180 displays a pop-up window D130-1 including the list of schedule items that the user can select. When the user selects the 'broadcast schedule' item 4, the controller 180 displays the window D140, which is similar to the window D40 in FIG. 6. The windows D150, D160, D170 and the soft key D150-1 in FIG. 8 are similar to the windows D50, D60, D70 and the soft key D50 in FIG. 6, respectively. Therefore, a description of the operation of these items in FIG. 8 will not be repeated.

Broadcast Program Title Input→Manual Search

Figure 9:
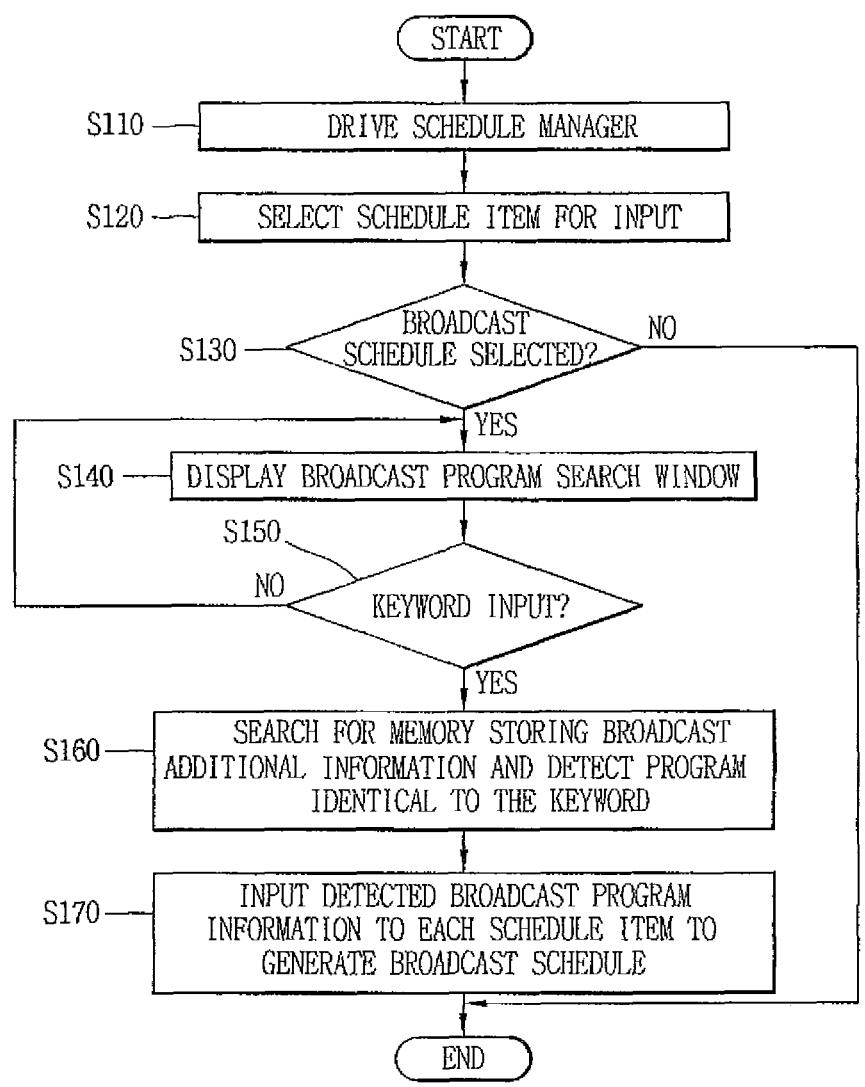
FIG. 9 is a flowchart illustrating a method of inputting a broadcast schedule according to still another embodiment of the present invention.
Figure 10:
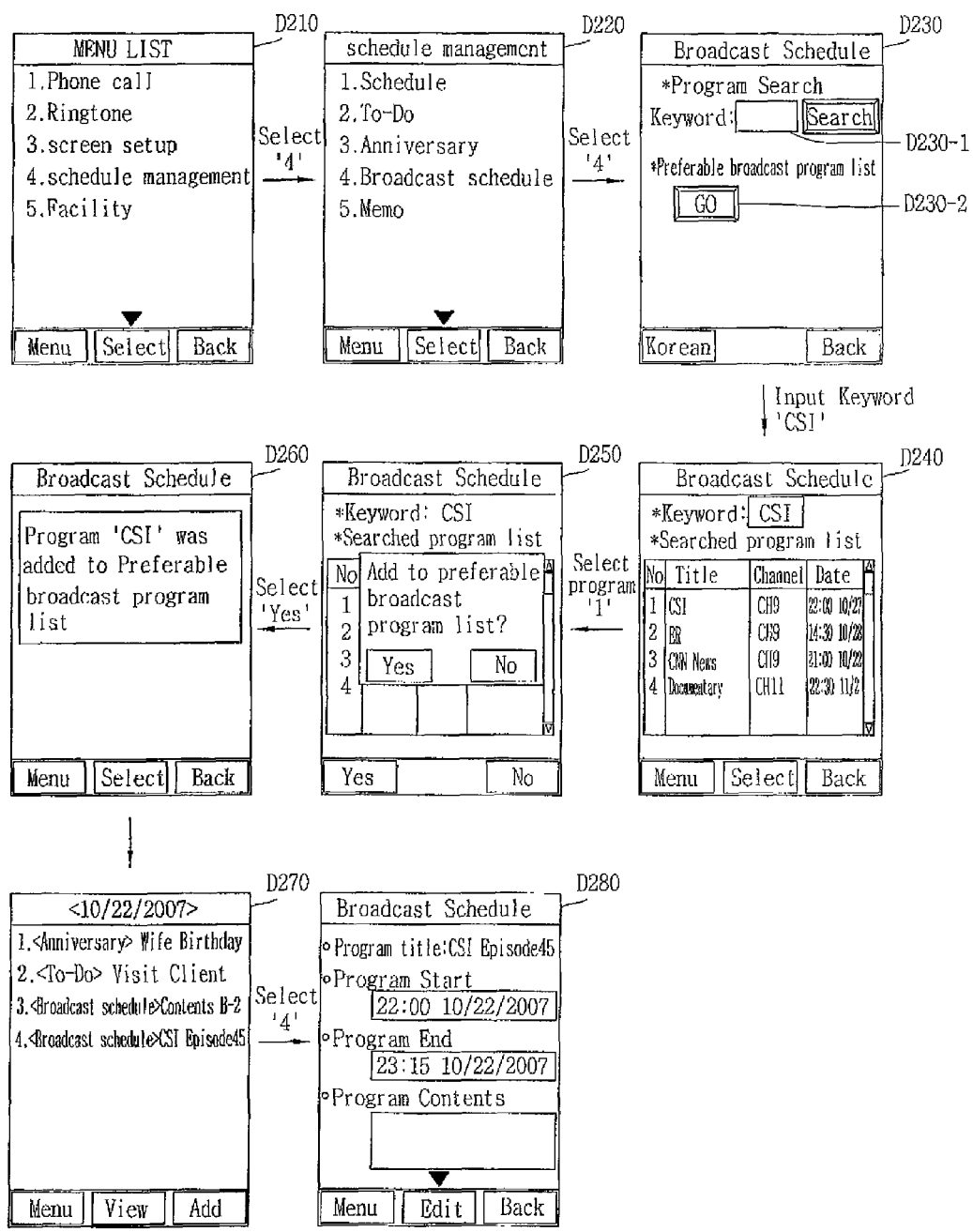
FIG. 10 is an overview of display screens illustrating a method of generating a broadcast schedule according to the embodiment of FIG. 9.

FIG. 9 is a flowchart illustrating a method of inputting a broadcast schedule according to another embodiment of the present invention, and FIG. 10 is an overview of display screens illustrating a process of generating a broadcast schedule according to the embodiment of FIG. 9.

With reference to FIGS. 9 and 10, the controller 180 first displays a window D210 including a plurality of menu items the user can select, the user selects the schedule management item 4 in the window D210, and the controller 180 executes the schedule manager and displays the window D220 including a list of scheduling items (S110 and S120). The user then selects the Broadcast schedule item 4 from the window D220 (Yes in S130), and the controller 180 displays a program search window D230-1 in the window D230 allowing the user to search for broadcast programs, etc. (S140).

Then, when the user enters the title 'CSI' corresponding to the broadcast program the user wants to search for (Yes in S150), the controller 180 searches the memory 130 that includes broadcast additional information (e.g., ESG information or the like) to detect information that includes the input keyword (S160). The controller 180 then displays the detected program(s) in the window D240.

As shown in the window D240, the controller 180 detected a plurality of programs corresponding to the keyword "CSI". The user then selects the program '1. CSI', and the controller 180 outputs a message in a pop-up window, for example, asking the user if they also want to add the selected program to the preferred list of broadcast programs (see the window 250 in FIG. 10).

Then, in the example shown in FIG. 10, the user selects the 'Yes' option and the controller 180 displays the window D260 indicating the selected broadcast program "CSI" was added to the preferred broadcast program list. The controller 180 then displays the window D270 including a list of schedule items (including the newly added CSI broadcast program and the previously added broadcast program Contents B-2). The user then selects the broadcast schedule item 4, and the controller 180 displays the window 280 including various information such as the starting time, ending time, program related contents, and the like related to the selected program in each item on the broadcast schedule screen D280 so as to generate a new broadcast schedule (S170). The controller 180 automatically generates the information shown in the window D280 using the broadcast additional information stored in the memory. The user can also select the 'Go' option D230-2 in the window D230 to display a list of preferred broadcast programs.

Figure 11:
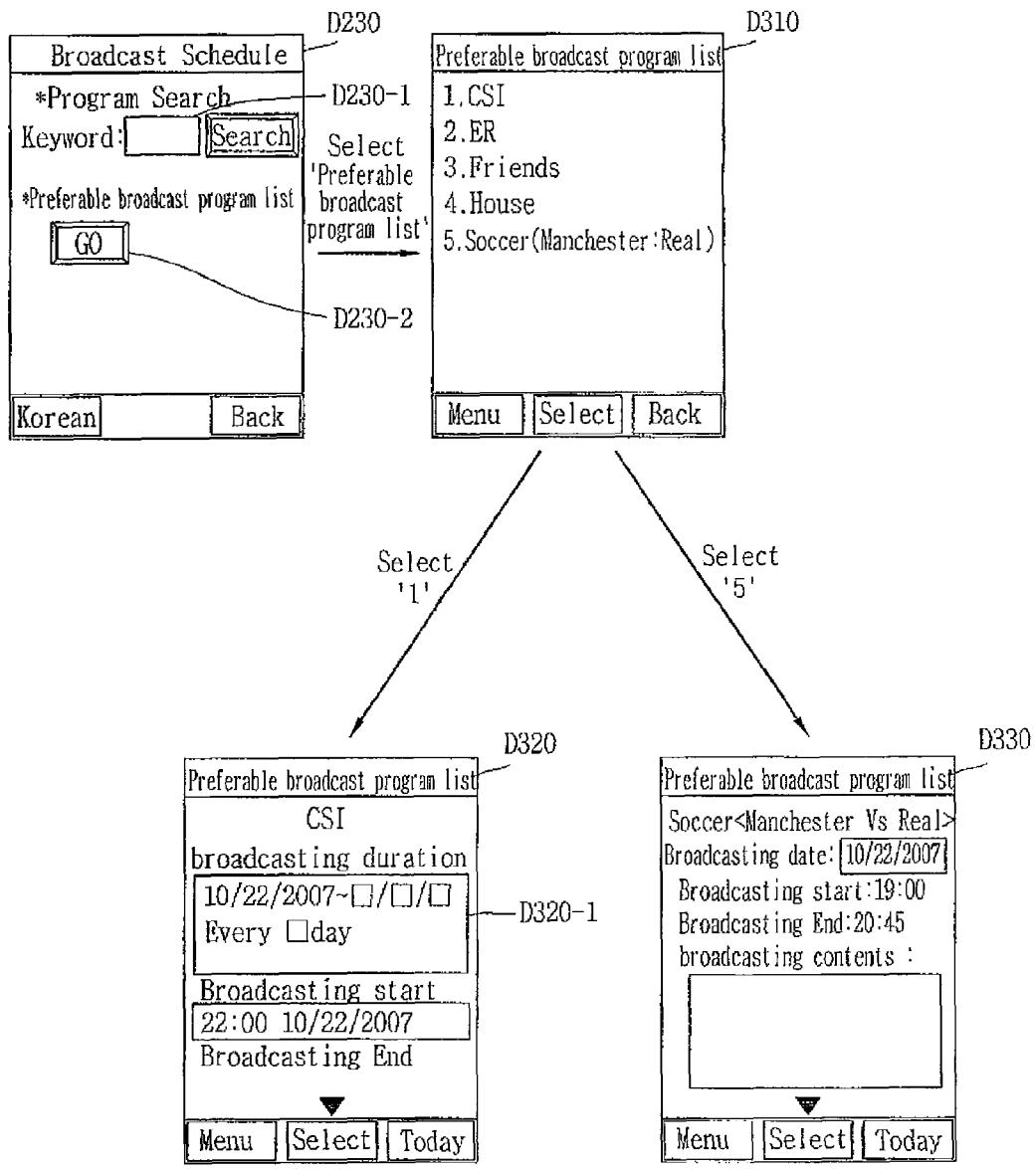
FIG. 11 is an overview of display screens including a list of preferable broadcast programs according to an embodiment of the present invention.

In more detail, FIG. 11 is an overview of display screens illustrating a broadcast program list according to another embodiment of the present invention. In this embodiment, the user selects the 'Go' option D230-2 in the window D230. As shown in FIG. 11, when the user selects the 'Go' option D230-2, the controller 180 displays a window D310 including a list of programs the user has designated as preferable broadcast programs.

The user can then select one of the preferred or favorite programs listed in the window D310. For example, the displayed window D320 illustrates information about the preferred program '1. CSI', and the displayed window D330 illustrates information about the preferred program '5. Soccer'. As shown in the window D320, the controller 180 displays information such as the title, the broadcast duration, and the broadcasting start and end times. The example in the display window D320 corresponds to a program that is regularly or periodically broadcast (e.g., every day, every week, etc).

In addition, and as discussed above, the controller 180 can detect information related to the duration, for which the corresponding program is broadcast, based upon the broadcast additional information (e.g., the ESG information or the like), thereby setting the broadcast duration. Also, if the broadcast additional information (e.g., ESG information or the like) does not include a broadcast duration of the corresponding program, the controller 180 can set a default value (e.g., once per month) for the broadcast duration.

Further, for a single program which is not periodically broadcast such as the soccer match in the window D330, the controller 180 displays the title of the match, the broadcast starting and end times, contents about the match, etc. Thus, when the user selects the 'Select' option in the window D310, the controller 180 displays information about the selected broadcast and adds the broadcast program to the user's schedule. Alternatively, the controller 180 can merely display the information about the selected programs as shown in the windows D320 and D330, and not add the corresponding programs to the user's schedule until the user selects the 'Select' option in the windows D320 and D330. That is, the user may want to view the contents of the program (duration, start and end times, etc.) before actually adding the program to the schedule.

Further, as discussed above, optional items can be added to the schedule generation such as whether an alarm alert is to be generated, an alarm time, a type of alarm (e.g., vibration, lamp, bell sound, etc.), a number of repetition of an alarm, a frequency of generating an alarm and the like. These values can be set as default values, and then be later changed by the user. The controller 180 then outputs an alarm based on the input information.

Setup of Schedule Using a Program Guide

Figure 12:
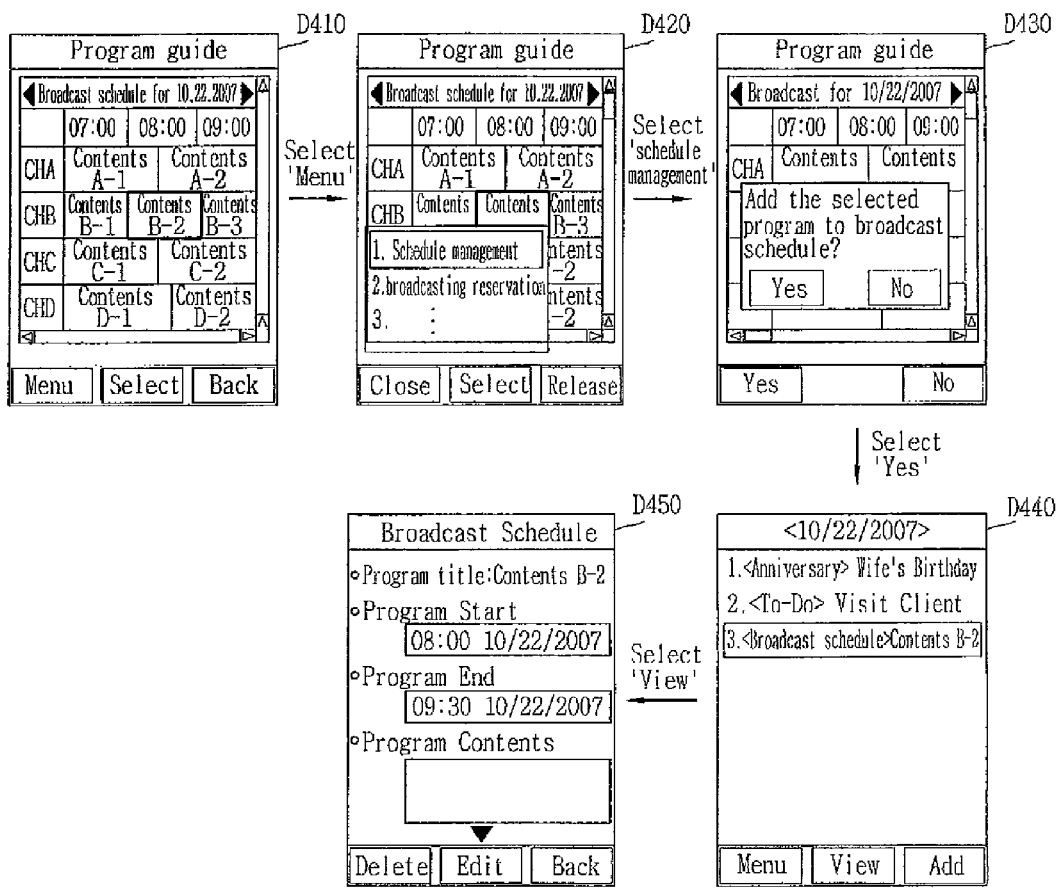
FIG. 12 is an overview of display screens illustrating a method of setting a schedule using a program guide according to an embodiment of the present invention.

This embodiment relates to adding a broadcast program to a user schedule using a broadcast program guide. In more detail, FIG. 12 is an overview of display screens illustrating a method of setting a schedule in a program guide. That is, as shown in FIG. 12, once the user selects a broadcast mode on the terminal via the input unit 120, for example, the controller 180 displays a window D410 including a broadcast guide or channel time table.

The user can then select a particular program from the broadcast guide and select the 'Menu' option. The controller 180 then displays the window D420. That is, the controller 180 displays a pop-up window, for example, that includes different menu items such as '1. Schedule management', '2. broadcasting reservation', etc. In the example shown in FIG. 12, the user has selected the program 'Contents B-2' and the menu item '1. Schedule management'.

As shown, the controller 180 then displays a window D430 including a prompt asking the user if they want to add the selected program to the broadcast schedule. The controller 180 can also automatically add the selected program to the broadcast schedule without prompting the user. In this instance, the controller 180 would not need to display the window D430.

As shown in the example in FIG. 12, the user has selected the 'Yes' option in the window D430, and the controller 180 displays a window D440 including information that the program has been added to the user's schedule. The user can also select the 'View' option in the window D440, and the controller 180 displays the window D450 including information about the broadcast program (e.g., title, start and end times, contents, abbreviated contents). As discussed above, the user can also edit this information using the 'Edit' option.

Setup of Schedule when Broadcast is being Watched

This embodiment relates to adding a current broadcast program into a user schedule while the user is viewing the corresponding broadcast program. In more detail, once the mobile terminal is converted into the broadcast mode and a channel to be broadcast is selected by the user, a broadcast stream of the channel received through an antenna is decoded via a decoding unit and output on the display 151.

Figure 13:
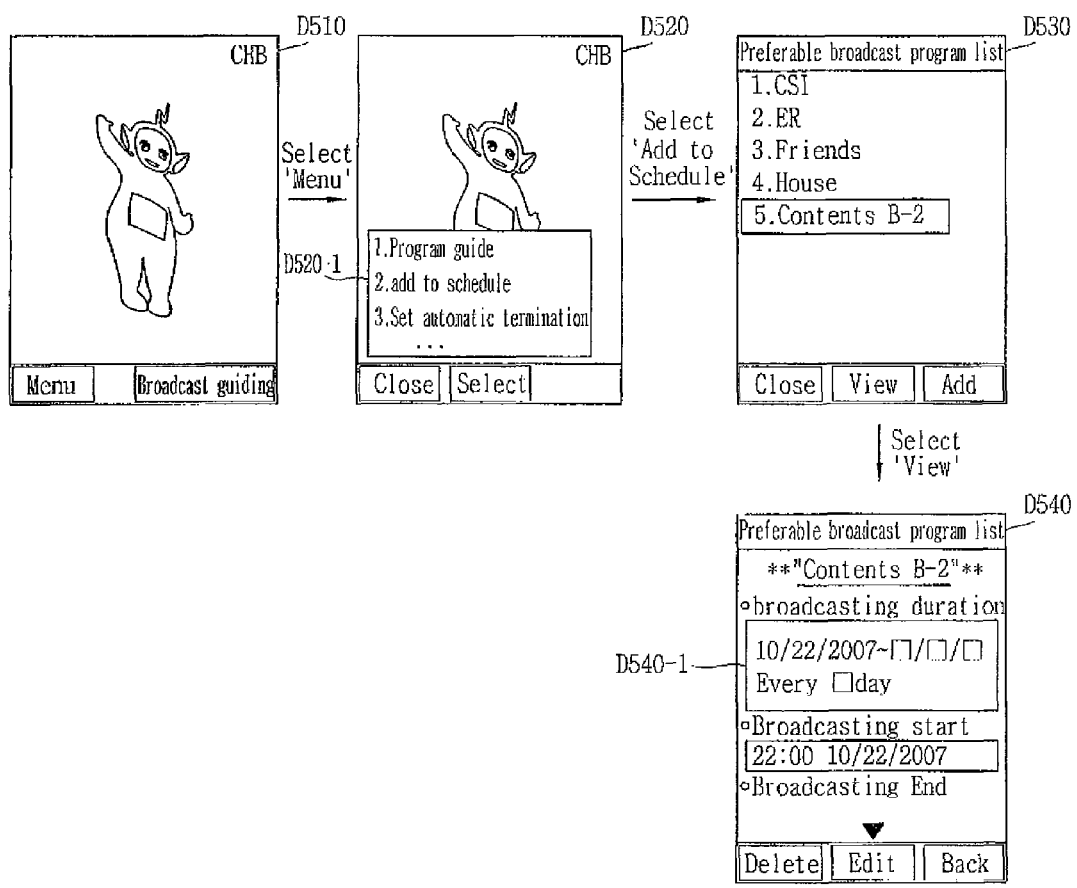
FIG. 13 is an overview of display screens illustrating a method of setting a schedule during broadcasting according to an embodiment of the present invention.

FIG. 13 is an overview of display screens illustrating an embodiment of setting a schedule when a broadcast is being viewed. As shown in the display screen D510 in FIG. 13, the user is viewing a broadcast of the channel CHB. Then, when the user selects a menu key (or other type of key) while viewing the broadcast, the controller 180 displays the window D520 including the broadcast as well as the menu window D520-1.

The menu window D520-1 allows the user to add the broadcast to the user's schedule. In more detail, if the user selects the '2. add to schedule' option from the menu window D520-1, the controller 180 displays a window D530 including a list of the user's preferred broadcast programs including the currently viewed broadcast on channel OHS (i.e., the program Contents B-2 in the example shown in FIG. 13).

The user can then select the 'View' option to view various information (e.g., starting time, ending time, program related contents and the like) related to the program (e.g., 'Contents B-2') as shown in the display window D540. The user's broadcast schedule is also updated to include this new broadcast program (i.e., 'Contents B-2' in this example).

For example, as shown in the window D540-1, this new broadcast program ('Contents B-2') is scheduled to be broadcast for a broadcast duration of two months (8 weeks) and is broadcast every Monday and Tuesday. In addition, the controller 180 also preferable issues an alarm every Monday and Tuesday for 8 weeks informing the user about the schedule broadcast program. As discussed above, the preferable broadcast program setup information in the display window D540 can be optionally changed by the user, and the controller 180 reflects the changed contents in the broadcast schedule of the corresponding program.

Further, the broadcast program currently being viewed by the user is a periodically broadcast (e.g., everyday, every week or every month) or is to be broadcast again at a later date. If the program is only to be broadcast one time, the controller 180 notifies the user the program is not to be rebroadcast and thus is not going to be saved to the user's schedule. In addition, if the program that is to be added to the schedule is already registered in the preferable broadcast program list or set in the schedule, the controller 180 notifies the user the program has already been saved to the broadcast schedule, preferable list, etc.

In addition, the controller 180 can automatically add the currently viewed broadcast program to the schedule when the user selects the 'Select' option in FIG. 13, without first displaying the window D530 including the preferred programs. That is, the user may want to add a particular broadcast to the schedule, but not want the program added to his or her favorites list. In this instance, the controller 180 can bypass displaying the window D530 and automatically store the currently viewed broadcast in the schedule.

Schedule Check

Figure 14:
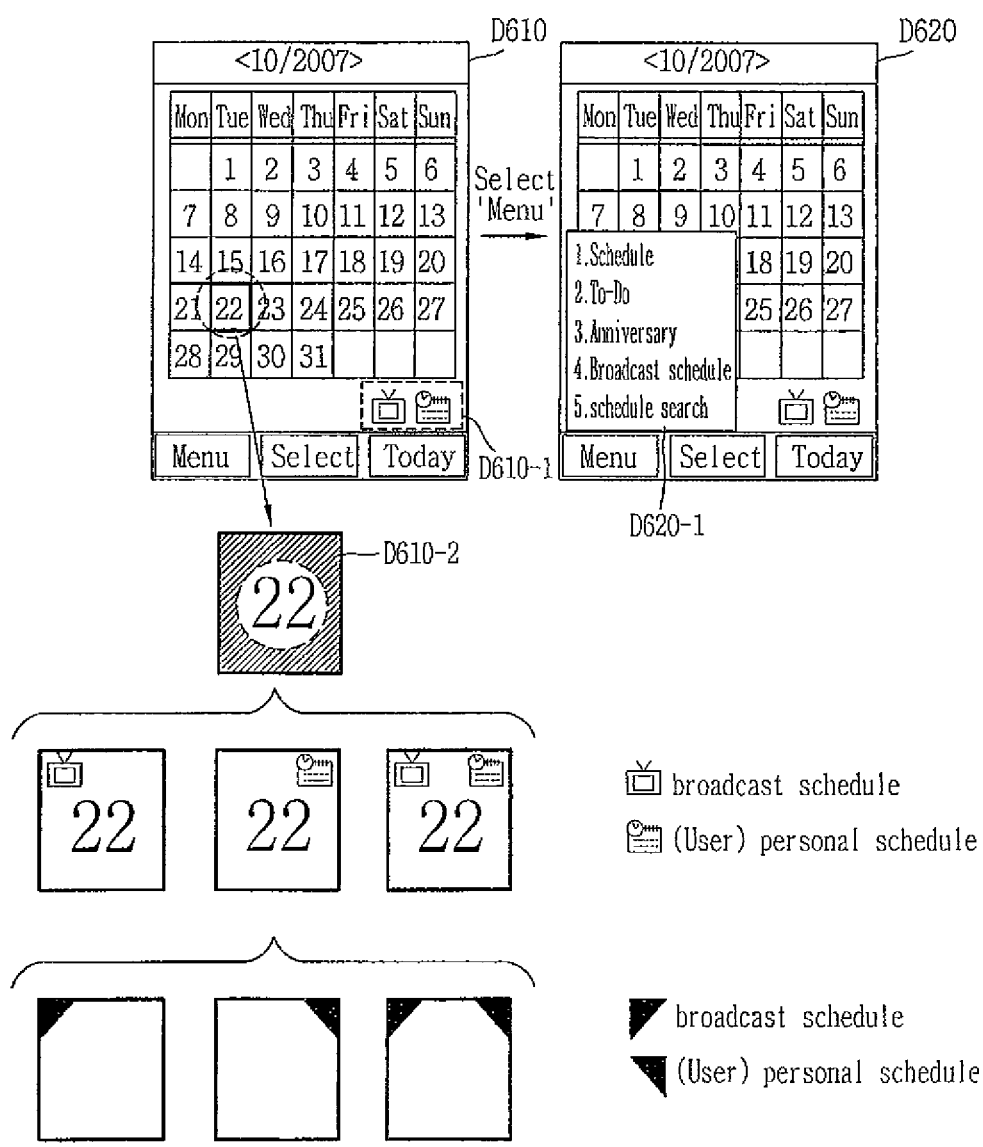
FIG. 14 is an overview of display screens illustrating management of an itinerary (calendar) of a schedule according to an embodiment of the present invention.

FIG. 14 is an overview of display screens illustrating management of an itinerary (calendar) of a schedule according to an embodiment of the present invention.

As shown in FIG. 14, the controller 180 displays a calendar window D610 including information such as icons D610-1 and D610-2 informing the user about whether or not a broadcast program has been scheduled. In particular, the controller 180 can display an icon D610-1 on a particular day of the itinerary or calendar (i.e., on the date 'Today' in FIG. 14) or can display a transparent icon D610-2 (or other type of icon) on the date of the calendar so as to facilitate the recognition as to whether the broadcast schedule has been registered.

As shown in FIG. 14, when the icon D610-2 is selected or the cursor is placed over the corresponding date, the controller 180 can display different types of information informing the user about whether a program is scheduled for that date. As shown in the lower portion of FIG. 14, the displayed information can be a small icon indicating a 'broadcast schedule', 'user personal schedule' or a combination of the icons informing the user whether a program is scheduled on that date, etc.

In addition, the controller 180 can also changes font types or font colors to facilitate the recognition as to whether the broadcast schedule has been registered. The controller 180 can also display a pop-up window indicating whether the broadcast schedule has been registered when a cursor is moved over or across the calendar.

In addition, as shown in FIG. 14, if the user selects the 'Menu' option in the window D620, the controller 180 displays a menu including a search option D620-1 that the user can use to search for a specific broadcast program or a schedule on the calendar. Further, the information used to inform the user about whether a program has been scheduled on a particular date can be the icons discussed above, or can be other types of identifiers such as text, a changed font type, size, etch or can be audio output. For example, if a program is schedule to be broadcast, the controller 180 can output a beeping sound, voice command, etc. when the user highlights a particular date informing the user that a program is scheduled on that particular date. The user can then select the particular date to obtain more information about the scheduled program.

Schedule Alarming Method

Figure 15A:
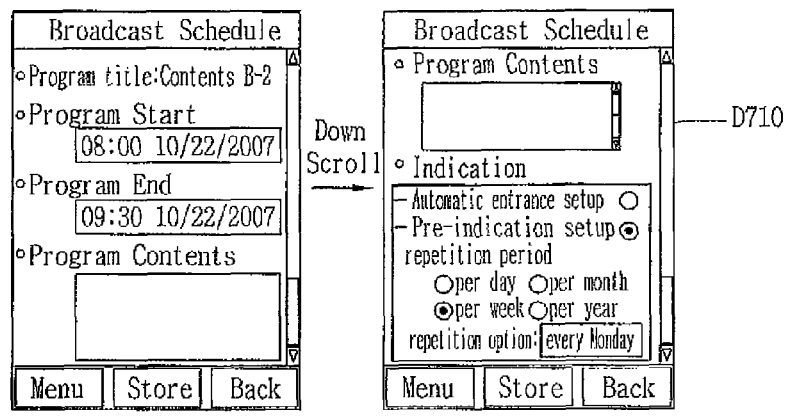
FIGS. 15A and 15B are overviews of displays screens illustrating a method for setting an alarm for a broadcast schedule according to an embodiment of the present invention.
Figure 15B:
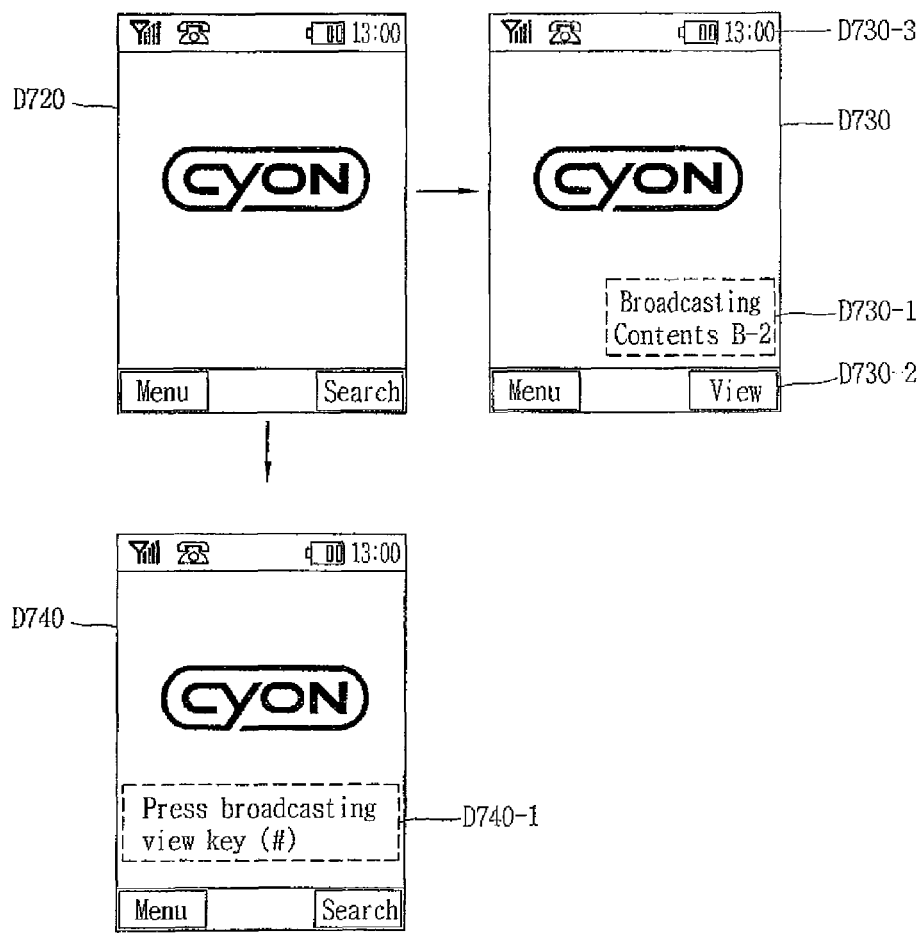

Next, FIGS. 15A and 15B are overviews of displays screens illustrating a method for setting an alarm for a broadcast schedule according to an embodiment of the present invention.

In particular, as shown in FIG. 15A, the user can scroll to a bottom portion of the broadcast schedule to select different alarm information for a particular broadcast. For example, the user can select an automatic entrance setup in which the broadcast program is automatically started at the indicating time. The controller 180 can also display information that the program has been started.

If the user selects the 'Pre-indication setup' option in the display window D710, the controller 180 outputs an alarm before the start of the scheduled program to inform the user the program is about to start. The alarm can be output an hour before, minutes before, etc. based on default values or user-set values. The user can also select whether the alarm is to be output per day, per month, etc. for programs that are periodically broadcast.

In addition, FIG. 15B illustrates the controller 180 beginning to convert the terminal from a call mode or idle screen as shown in the display screen D720 to a broadcast mode as shown in the display screen D730. As shown in the display screen D730, the controller 180 informs the user the broadcast program is to be started via a pop-up message D730-1. The controller 180 can also display a window D740 that includes a prompt D740-1 requesting the user select the 'View key #' to begin watching the scheduled broadcast.

Further, the controller 180 also determines whether the mobile terminal is currently performing another operation (e.g., composing a message, placing a call, reproducing a music file (MP3), accessing an Internet or the like) when entering the broadcast mode. If the mobile terminal is performing another operation, the controller 180 preferably provides an alarm informing the user the program is to be broadcast using a pop-up window, bell sound, vibration, lamp or the like, to notify the user of the start of the program Contents B-2.

In addition, even if the user has missed the start of the program for a certain reason, the user can see the displayed message D730-1 indicating the program is currently being broadcast. The information D730-1 can be displayed for a particular period of time after the program has been started, until a user disables the prompt, or for the entire program, etc. In addition, a icon D730-3 can also be displayed to inform the user about the broadcast program. The icon D730-7 is displayed in an area different than where the broadcast program is being displayed so as not to partially block the viewing of the program.

Further, as discussed above, when the controller 180 outputs an alarm that the program is going to be broadcast, the user can select the 'View' option D730-2. In one example, the 'View' option D730-2 is a soft key functioning as a hot key. That is, when the user touches or presses the soft key D730-2, the controller 180 converts the mobile terminal into the broadcast mode, and outputs a screen for the current broadcast program.

In addition, in the display screen D740, the message D740-1 includes the view key as the "# sign. Thus, the user can select the "#" key on the terminal to begin viewing the broadcast. Thus, the controller 180 can determine a particular key as a hot key regardless of its original function.

As described above, the mobile terminal according to the present invention adds a desired program to a program guide in a personal scheduling chart (e.g., calendar), thus allowing the user to easily check schedules for desired broadcast programs. Further, the user can add a desired program to their schedule in a broadcast mode, general mode, etc. The user can also search for scheduled broadcasts, is informed about upcoming broadcast, and can easily add broadcast programs to schedule information included on the terminal.

In addition, the mobile terminal according to embodiments of the present invention may include a separate menu or option that the user can select to set a particular broadcasting system. Further, when the user is making a broadcast schedule, the user can set a currently receivable digital broadcasting system (e.g., DMB-T, DMB-S, MediaFLO, DVB-H, ISDB-T, etc.) through an appropriate broadcasting system setting menu.

Further, the above various embodiments may be implemented in a computer-readable medium using, for example, computer software, hardware, or some combination thereof. For a hardware implementation, the embodiments described above may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof.

For a software implementation, the embodiments described herein may be implemented with separate software modules, such as procedures and functions, each of which perform one or more of the functions and operations described herein. The software codes can be implemented with a software application written in any suitable programming language and may be stored in memory (for example, the memory 160), and executed by a controller or processor (for example, the controller 180).

In addition, the mobile terminal 100 may be implemented in a variety of different configurations. Examples of such configurations include a folder-type, slide-type, bar-type, rotational-type, swing-type and combinations thereof. The mobile terminal also corresponds to different types of electronic devices such as mobile phones, smart phones, notebook computers, digital broadcast terminals, personal digital assistants (PDA), portable multimedia players (PMP), navigators, and the like.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A mobile terminal comprising:
a display unit configured to output a broadcast corresponding a broadcast stream received through an antenna;
an input unit configured to receive a signal for adding a broadcast schedule of a broadcast program currently displayed on the display unit to a user-schedule, wherein the user-schedule information includes an anniversary and/or to-do list;
a broadcast receiver configured to receive detailed information related to the broadcast program currently displayed on the display unit according to the signal received by the input unit; and
a controller configured to store the broadcast schedule of the broadcast program corresponding to the broadcast presently being output on the display unit on the user-schedule based on the received detailed information if the broadcast program currently displayed on the display unit is periodically broadcast or to be broadcast again at a later date,
wherein the broadcast schedule of the broadcast program currently displayed on the display unit is not stored on the user-schedule if the broadcast program currently displayed on the display unit is only to be broadcast one time.

2. The mobile terminal of claim 1, wherein the broadcast schedule is integrated with the user-scheduled information.

3. The mobile terminal of claim 1, wherein the controller is further configured to output an alarm or notification in at least one of a visual manner, an audible manner, and a tactile manner to notify that the broadcast program is about to be broadcast.

4. The mobile terminal of claim 1, wherein the stored broadcast schedule includes at least a starting time, an ending time of the broadcast program, a title of the broadcast program, and additional contents related to the selected broadcast program.

5. The mobile terminal of claim 1, wherein the controller detects duration information of the broadcast program based upon the received detailed information and stores the detected duration information on the user-schedule.

6. The mobile terminal of claim 5, wherein the controller performs an alarm operation according to the duration information during the broadcast program duration.

7. The mobile terminal of claim 1, wherein the controller adds the broadcast program to a user's preferred broadcast programs when the input unit receives the signal for adding the broadcast schedule of the broadcast program to the user-schedule, and notifies a user if the broadcast program is already registered in the preferable broadcast program list.

8. The mobile terminal of claim 1, wherein the controller outputs the user-schedule based on the user's selection, and displays at least one of the received detailed information on the user-schedule corresponding to the broadcast schedule of the broadcast program.

9. A method of controlling a mobile terminal, the method comprising:
displaying a broadcast, on a display unit of the mobile terminal, corresponding a broadcast stream received through an antenna;
receiving a signal, by an input unit of the mobile terminal, for adding a broadcast schedule of a broadcast program currently displayed on the display unit to a user-schedule, wherein the user-schedule info nation includes an anniversary and/or to-do list;

receiving detailed information related to the broadcast program currently displayed on the display unit according to the signal received by the input unit; and storing the broadcast schedule of the broadcast program corresponding to the broadcast presently being output on the display unit on the user-schedule based on the received detailed information if the broadcast program currently displayed on the display unit is periodically broadcast or to be broadcast again at a later date, wherein the broadcast schedule of the broadcast program currently displayed on the display unit is not stored on the user-schedule if the broadcast program currently displayed on the display unit is only to be broadcast one time.

10. The method of claim 9, wherein the broadcast schedule is integrated with the user-scheduled information.

11. The method of claim 9, further comprising:
outputting an alarm or notification in at least one of a visual manner, an audible manner, and a tactile manner to notify that the broadcast program is about to be broadcast.

12. The method of claim 9, wherein the stored broadcast schedule includes at least a starting time, an ending time of the broadcast program, a title of the broadcast program, and additional contents related to the selected broadcast program.

13. The method of claim 9, further comprising:
detecting duration information of the broadcast program based upon the received detailed information; and
storing the detected duration information on the user-schedule.

14. The method of claim 13, further comprising:
performing an alarm operation according to the duration information during the broadcast program duration.

15. The method of claim 9, further comprising:
adding the broadcast program to a user's preferred broadcast programs when the input unit is received the signal for adding the broadcast schedule of the broadcast program to the user-schedule; and
notifying a user if the broadcast program is already registered in the preferable broadcast program list.

16. The method of claim 9, further comprising:
outputting the user-schedule based on the user's selection; and
displaying at least one of the received detailed information on the user-schedule corresponding to the broadcast schedule of the broadcast program.

\* \* \* \* \*